United States Patent [19]

Ridenour

[11] Patent Number: 5,346,138
[45] Date of Patent: Sep. 13, 1994

[54] SEAL FOR METERING ORIFICE

[75] Inventor: Ralph G. Ridenour, Mansfield, Ohio

[73] Assignee: Universal Enterprises Inc., Mansfield, Ohio

[21] Appl. No.: 18,086

[22] Filed: Feb. 16, 1993

[51] Int. Cl.$^5$ ............................................. B05B 15/08
[52] U.S. Cl. ................................. 239/600; 285/331
[58] Field of Search ............... 239/550, 551, 602, 600, 239/591; 285/384, 353, 331; 277/105, 110, 210

[56] References Cited

U.S. PATENT DOCUMENTS

| | | | |
|---|---|---|---|
| 748,807 | 1/1904 | Spratt | 285/331 |
| 2,404,664 | 7/1946 | Skinner | 273/110 |
| 2,456,784 | 12/1948 | Jones | 239/560 X |
| 2,508,874 | 5/1950 | Turnbull | 239/591 X |
| 2,746,486 | 5/1956 | Gratzmuller | 285/917 X |
| 2,767,710 | 10/1956 | Blackman | 285/331 X |
| 2,960,198 | 11/1960 | Keefe, Jr. | |
| 3,287,034 | 11/1966 | Bragg | 285/331 X |
| 3,618,990 | 11/1971 | Falke | 285/353 X |
| 4,349,073 | 9/1982 | Zublin | 239/550 X |

*Primary Examiner*—Andres Kashnikow
*Assistant Examiner*—Kevin P. Weldon

*Attorney, Agent, or Firm*—Pearne, Gordon, McCoy & Granger

[57] ABSTRACT

The present invention provides an improved seal for a metering orifice between an orifice seal member and an orifice housing. The orifice housing includes first and second upper surfaces which are separated by an annular groove or notch, the first surface being adjacent a central bore and recessed from the second surface. The first surface is sealably engaged by a sealing surface provided by the orifice seal member. The orifice seal member includes a stem which is threadably received by the central bore, and which is surrounded by the sealing surface. Threadably mounting the orifice seal member to the orifice housing engages the sealing surface with the first surface and causes the first surface to be compressed, compensating for the derogatory effects of imperfections in the first surface, and, also, moving a cylindrical wall surrounding the central bore radially inwardly toward the central bore to allow the orifice seal member and the orifice housing to sealably engage thereby seal the central bore and allow fluid to only exit via the metering orifice. Alternate embodiments of the invention provide the first surface relatively above and relatively even with the second surface.

22 Claims, 3 Drawing Sheets

SEAL FOR METERING ORIFICE

BACKGROUND OF THE INVENTION

In presently-used devices which meter an amount of fluid, leak-resistant seals are difficult to form. Typically, as shown in FIG. 1, devices of this type include an orifice seal member 10 and an orifice housing 12. The housing 12 provides a central bore 14 which sealably receives a fluid carrying conduit (not shown) and threadably receives the orifice seal member 10. The orifice seal member provides a fluid passage 16 which communicates fluid from the central bore 14 to a metering orifice 18.

The central bore 14 is sealed by engaging a surface 20 surrounding the central bore, which defines a seat, with an annular surface 22 provided by the orifice seal member 10. Although this arrangement works satisfactorily some of the time, there exists a reoccurring problem in forming a reliable seal between the seat 20 and the annular surface 22 and, therefore, leaks develop.

Surface imperfections in the seat 20, either created at the time of manufacturing the orifice housing 12 or at a later time, allow fluid to leak out of the central bore 14. Since the orifice seal member 10 is designed to be replaced or exchanged for other seal members which provide a different metered flow, the seat 20, in its location at the top surface of the orifice housing 12, is susceptible to damaging contact each time the orifice seal member 10 is removed. Also, the seat, due to its being part of a much larger surface, is generally not compressible and, therefore, generally intolerant, from a sealing standpoint, of surface imperfections. In devices of the aforementioned type, when surface imperfections are present in the seat 20, fluid from within the central bore 14 leaks out between the seat 20 and the annular surface 22.

In attempting to stop the leaks, the installer will typically over-tighten the orifice seal member 10, causing its head portion 24 to deform or bulge. If over-tightened too much, the head portion 24 will be so misshapen that the normal compression tests cannot be performed. Even when over-tightened to this extent leaks persist due, in part, to the incompressibility of the seat 20.

Therefore, there exists a need in the art for a device which provides a reliable seal between the orifice seal member and the orifice housing. There also exists a need for an orifice housing which provides a protected sealing surface to reduce the chance that damaging contact with the sealing surface or seat provided by the orifice housing will occur. There also exists a need in the art for a device which provides a seal between the orifice seal member and the orifice housing that is tolerant of surface defects or imperfections.

SUMMARY OF THE INVENTION

The present invention is directed toward an improved seal between an orifice seal member and an orifice housing. The orifice housing provides a seat which is relatively protected or safe from being damaged by unintentional or accidental contact therewith. The orifice housing also provides a seat which is relatively tolerant of surface imperfections, and which will seal even when the surface includes scratches or other irregularities.

According to the present invention, the orifice housing includes first and second surfaces which surround a central threaded bore, the first surface defining a seat. The orifice seal member includes a metering orifice, a threaded stem, and a sealing surface.

In accordance with one embodiment of the present invention, the first surface is recessed from the second surface to at least partially protect the first surface from damage due to unintentional or accidental contact therewith. In accordance with another embodiment of the present invention, the first surface extends or projects out of the second surface. According to a third embodiment, the first surface and the second surface are co-planar. In each embodiment, the sealing surface engages the first surface to sealably mount the orifice seal member to the orifice housing.

In accordance with another feature of the present invention, a groove or notch separates the first and second surfaces. The groove allows the first surface to be compressed by the sealing surface and thereby reduce the deleterious effects of surface imperfections in the first surface or seat. The groove also allows a cylindrical wall surrounding the bore to be drawn or move radially inwardly toward the central bore, and thereby allows the sealing surface of the orifice seal member to better sealably engage the seat provided by the orifice housing.

BRIEF DESCRIPTION OF THE DRAWING FIGURES

The present invention will be better understood with reference to the following description and drawings, wherein.

DETAILED DESCRIPTION OF THE PREFERRED EMBODIMENTS

Figure 1:
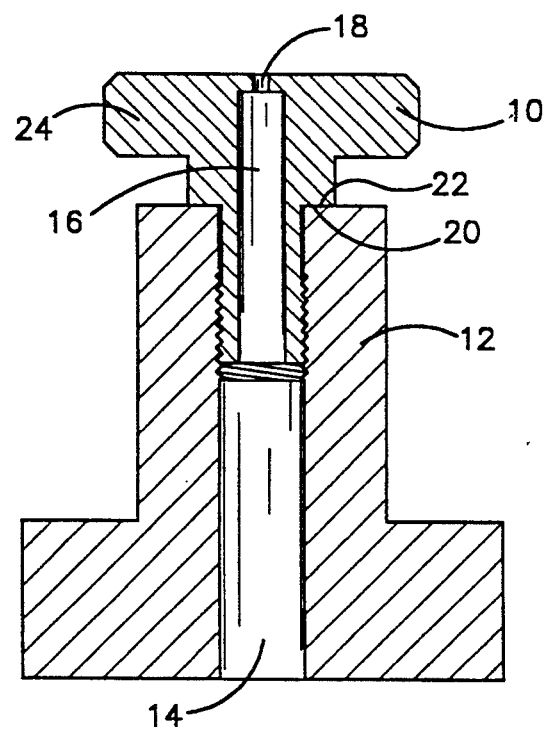
FIG. 1 is an elevational view, in cross-section, of a prior art orifice seal member and orifice housing.

With reference to the drawing figures, the present invention is shown to provide an improved seal between an orifice seal member 30 and an orifice housing 32. Preferably, the orifice seal member 30 and orifice housing 32 sealingly cooperate to provide a metered amount of natural or LP gas, as will be described more fully hereafter.

Figure 2:
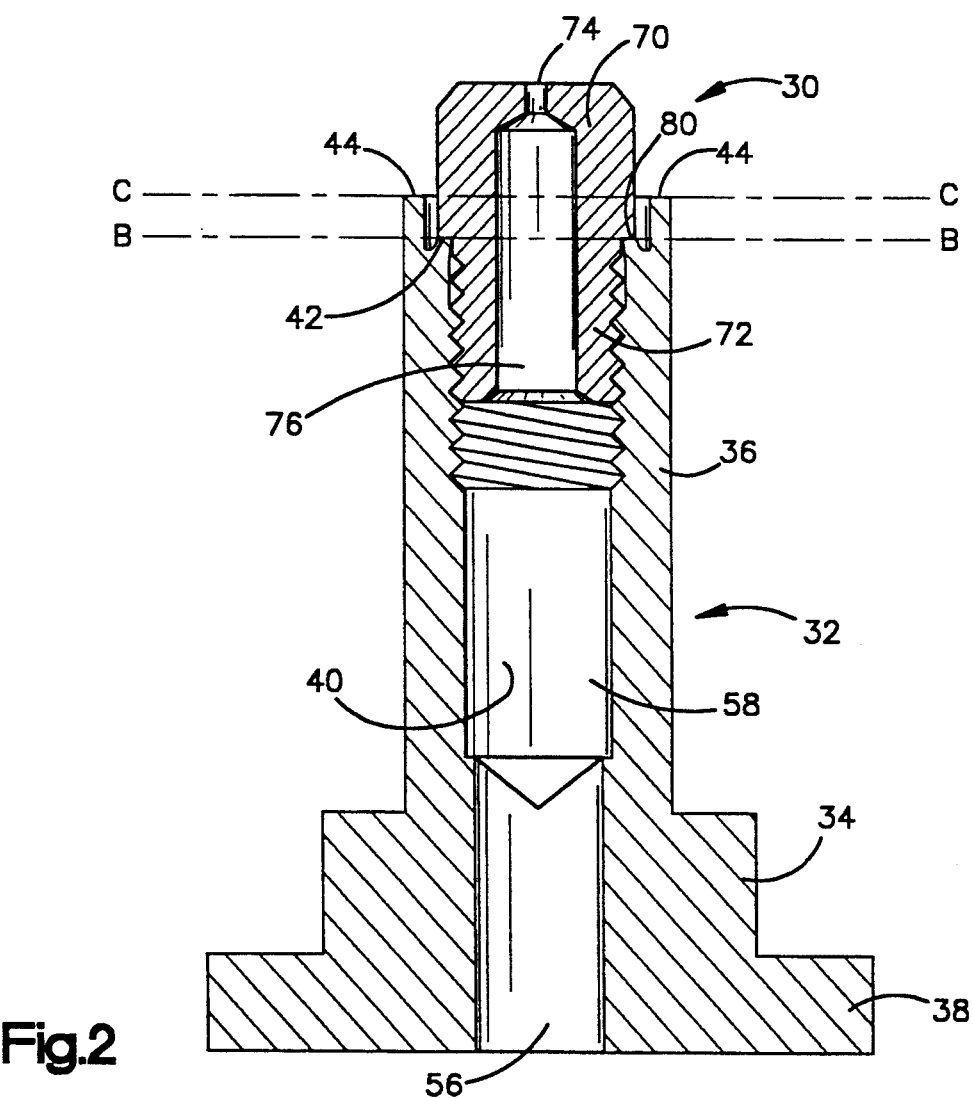
FIG. 2 is an elevational view, in cross section, of the orifice seal member and orifice housing in accordance with the present invention.
Figure 3:
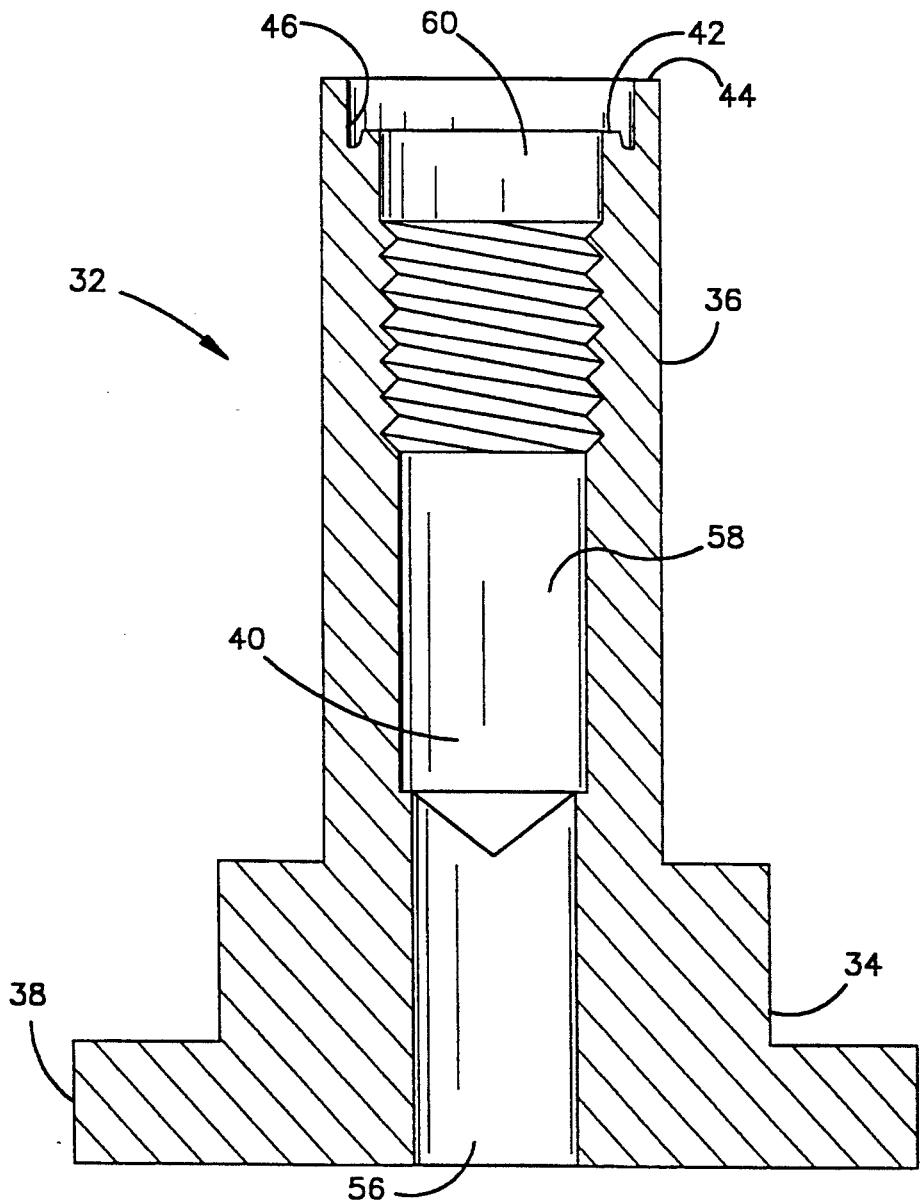
FIG. 3 is an elevational view, in cross section, of the orifice housing.

As shown best in FIGS. 2 and 3, the orifice housing 32, which is preferably made out of aluminum, includes a head portion 34 and a stem portion 36. The head portion 34 preferably provides a hexagonal nut 38 to facilitate holding of the orifice housing 32 during insertion of the orifice seal member 30 and during mounting of a fluid carrying conduit (not shown) therein. A central longitudinal bore 40 extends through the head portion 34 and the stem portion 36.

The stem portion 36 is generally cylindrical, and provides first and second concentric annular surfaces 42, 44 which are coaxial with the longitudinal bore 40. The first annular surface 42 is adjacent and surrounds the longitudinal bore 40, while the second annular surface 44, which has a relatively larger diameter than the first annular surface, is outwardly spaced therefrom. The first annular surface 42 defines a first plane B—B which is generally inwardly spaced or recessed from, but parallel to, a second plane C—C defined by the second annular surface 44.

An annular groove or notch 46 separates the first and second annular surfaces 42, 44. As shown best in FIGS. 2 and 5, the annular groove 46 is generally defined by a sloping sidewall 48 and a relatively flat or curved bottom 50, and is concentric with and adjacent the first annular surface 42. An annular wall 52 extends upwardly from the bottom 50 toward the second annular surface 44. A short cylindrical wall 54 is defined by the central bore 40, the first surface 42, and the sloping sidewall 48. As will be described more fully hereafter, the short cylindrical wall 54 is drawn radially inwardly when the orifice seal member 30 is mounted to the orifice housing. The sloping sidewall 48 of the V-shaped groove 46 is at an angle A with respect to the annular wall 52 and, preferably, the angle A is equal to about 23°.

In the illustrated first embodiment, the first annular surface 42 has a width of about 0.012 inches, the second annular surface 44 has a width of about 0.027 inches, the stem 36 has a diameter of about 0.351 inches, and the second annular surface 44 is outwardly spaced about 0.050 inches from the first annular surface 42. Preferably, the groove 46 has a depth of about 0.070 inches, a bottom surface 50 width of about 0.008 inches, and a depth of about 0.020 inches.

The longitudinal bore 40 includes a head bore 56, a stem bore 58, and a terminal bore 60. The terminal bore 60 extends from the first annular surface inwardly about 0.160 inches and has a diameter of about 0.240 inches. The terminal bore 60 intersects or terminates in the stem bore 58, which is threaded at an end adjacent the terminal bore and has a diameter of about 0.205 inches. The head bore 56 preferably has a diameter of about 0.179 inches and intersects or terminates in the stem bore 58.

Figure 4:
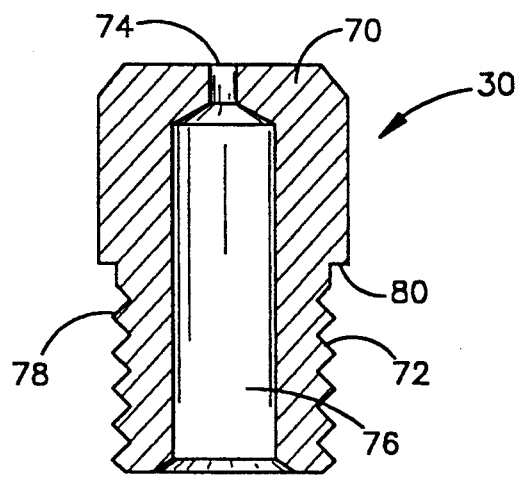
FIG. 4 is an elevational view, in cross section of the orifice seal member.

With reference to FIGS. 2 and 4, the orifice seal member 30, which is preferably made out of brass, is shown. The orifice seal member includes a nut-like cap portion 70 and an exteriorly threaded stem 72. The cap portion 70 defines a metering orifice 74 while the cap portion 70 and threaded stem 72 cooperate to define a longitudinal fluid passage 76. The fluid passage 76 and metering orifice 74 are coaxial and intersect.

Exterior threads 78 provided by the stem 72 cease a short distance before the stem merges with the cap portion 70. The cap 78 is of a larger diameter than the stem 72, and provides an annular sealing surface 80 at the intersection of the stem 72 and cap 70, as illustrated. As will be described more fully hereafter, the sealing surface 80 engages the first surface 42 of the orifice housing 32 to seal the central bore 40 of the orifice housing and allow fluid to flow or exit only through the fluid passage 76 and the metering orifice 74.

Preferably, the annular sealing surface 80 has a diameter of about 0.274 inches and a width of about 0.0205 inches. The fluid passage 76 has a diameter of about 0.108 inches and the threaded stem 72 has a diameter of about 0.233 inches. Naturally, the size of the metering orifice 74 will be selected such that a desired amount of fluid flows therethrough.

Figure 5:
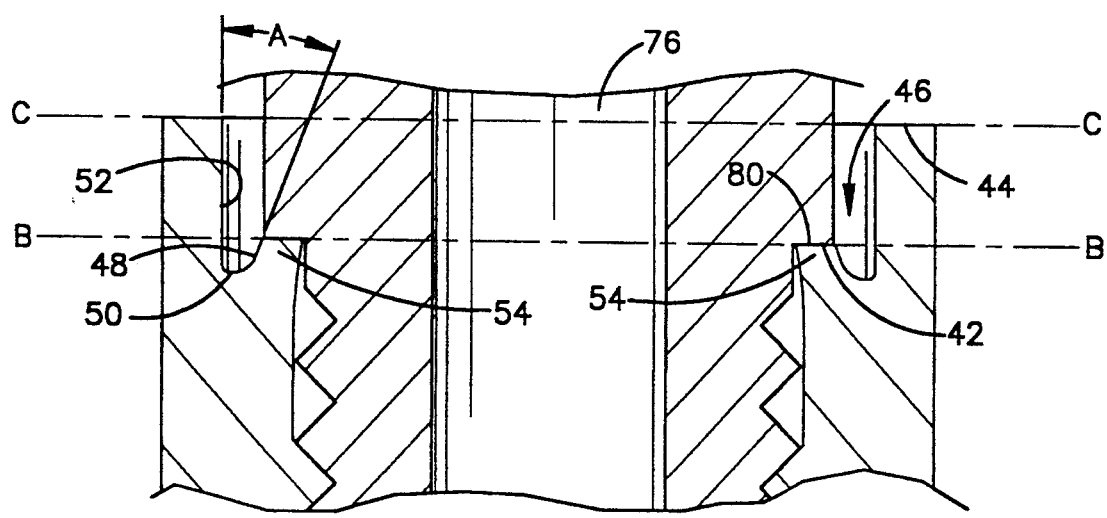
FIG. 5 is an enlarged cross-sectional view of the area in which the orifice seal member and the orifice housing sealably engage in a first embodiment of the present invention.

The orifice seal member 30 is sealably mounted to the orifice housing 32 by inserting the threaded stem 72 of the orifice seal member into the central bore 40 and rotating the stem to threadably engage the threaded wall surrounding the bore. As the orifice seal member 30 is drawn toward the orifice housing 32, the sealing surface 80 approaches the first surface 42 and, eventually, engages the first surface. Further rotation or insertion of the orifice seal member 30 into the central bore 40 compresses the first surface 42 and causes the short cylindrical wall 54 to be drawn or pulled radially inwardly as shown in FIG. 5, increasing or augmenting the sealing engagement of the sealing and first surfaces 80, 42 and reducing the likelihood of leaks caused by surface imperfections.

Naturally, the orifice seal member 30 is removable and is intended to be replaced numerous times during the useful life of the orifice housing 32. It has been found that the sealing engagement between the first and sealing surfaces 42, 80 increases or is better the more times the orifice seal member 30 is mounted within the orifice housing 32. This is contrary to existing orifice seal members and orifice housings wherein the sealing engagement generally deteriorates as the orifice housing ages due to the formation of surface imperfections in the first surface of the orifice housing. It is thought that, in the present invention, the relatively protected position of the first surface 42, and the repeated compression of the first surface 42, conspire to allow the seat provided or defined by the first surface 42 to improve during its useful life. This also generally extends the useful life of the orifice housing as compared with the prior art orifice housings and, thus, reduces the net operating cost of the system in which it is employed.

Figure 6:
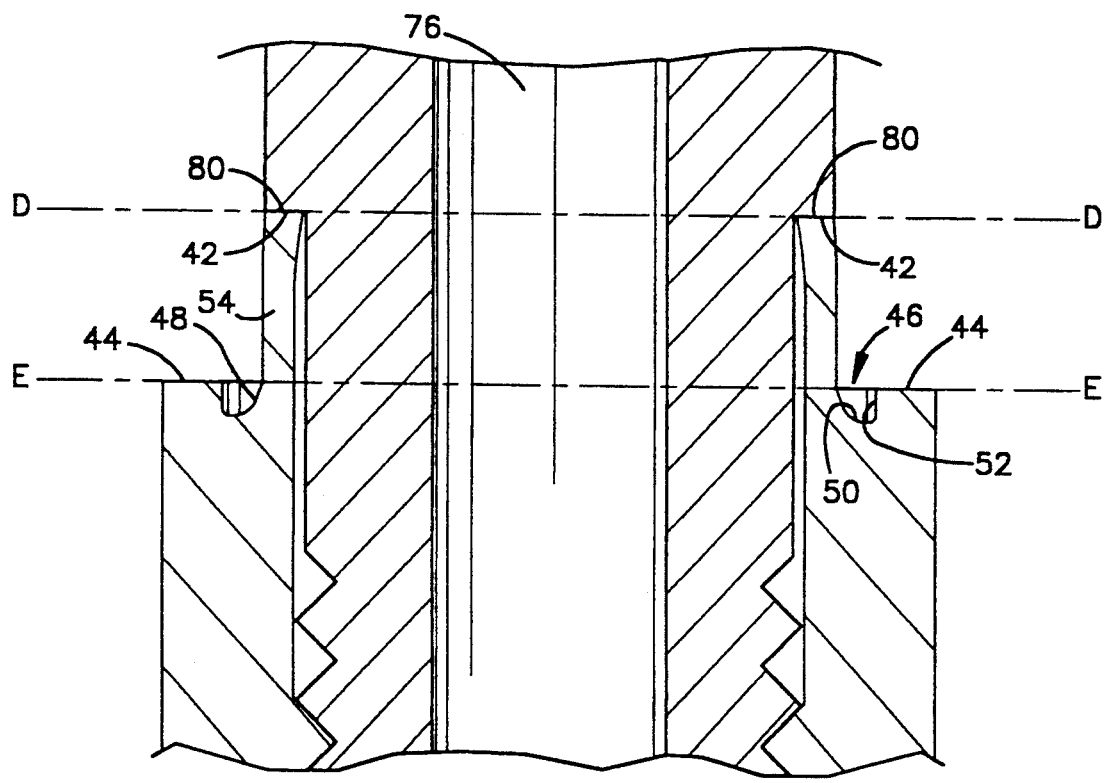
FIG. 6 is an enlarged cross-sectional view of the area in which the orifice seal member and the orifice housing sealably engage in a second embodiment of the present invention; and, FIG. 7 is an enlarged cross-sectional view of the area in which the orifice seal member and the orifice housing sealably engage in a third embodiment of the present invention.
Figure 7:
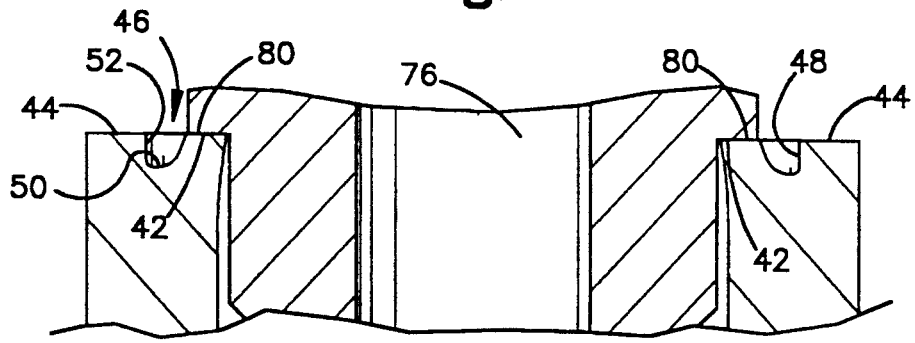

FIGS. 6 and 7 illustrate additional embodiments of the orifice housing wherein the first surface 42 is not recessed from the second surface 44. In the second preferred embodiment illustrated in FIG. 6, the first annular surface 42 defines a first plane D—D which is generally outwardly spaced or extends from, but parallel to, a second plane E—E defined by the second annular surface 44. Likewise, a third preferred embodiment illustrated in FIG. 7 shows the first and second annular surfaces 42, 44 being generally co-planar but separated by the groove 46. Naturally, various modifications are anticipated. For example, in the first and second embodiments it is contemplated that the groove may be eliminated or that the second and first surfaces will not define parallel planes.

Therefore, while the preferred embodiments of the present invention is shown and described herein, it is to be understood that the same is not so limited but shall cover and include any and all modifications thereof which fall within the purview of the invention as defined by the claims appended hereto.

What is claimed is:

1. A device for dispensing a metered amount of fluid, comprising:

an orifice seal member, said orifice seal member comprising a sealing surface and defining a metering orifice through which the metered amount of fluid flows, said sealing surface being generally planar;

an orifice housing, said orifice housing comprising first and second outer surfaces which generally surround a bore defined by said orifice housing, said first surface defining a first plane, said bore being adapted to removably receive said orifice seal member and sealingly receive a fluid carrying conduit such that fluid from said conduit is communicated to the metering orifice, wherein the first and second surfaces have an axis in common with the sealing surface when said orifice seal member is received within the bore, said first surface being engaged by said sealing surface when said orifice seal member is received within the bore such that one of said first surface and said sealing surface is at least partially axially compressed and radially deformed to sealably mount the orifice seal member to the orifice housing.

2. A device according to claim 1, wherein said second surface defines a second plane, said first and second planes being generally parallel.

3. A device according to claim 1, wherein said orifice seal member further comprises a threaded stem, said threaded stem being surrounded by the sealing surface and being threadably received by the bore.

4. A device according to claim 3, wherein said first surface is recessed from the second surface to at least partially protect the first surface from being damaged when the orifice seal member is not received within the bore.

5. A device according to claim 3, wherein said threaded stem defines a fluid passageway, said fluid passageway being generally coaxial with said metering orifice, the fluid being communicated from said conduit to said metering orifice via the bore and fluid passageway.

6. A device according to claim 5, wherein the first surface is compressed by the sealing surface and a cylindrical wall surrounding the bore is drawn radially inward toward the cylindrical bore to sealably mount the orifice seal member to the orifice housing.

7. A device according to claim 4, wherein the first and second surfaces are separated by a groove.

8. A device according to claim 5, wherein the first and second surfaces are separated by a groove.

9. A device according to claim 8, wherein the groove is annular and generally V-shaped in cross-section.

10. A device for dispensing a metered amount of fluid, comprising:
an orifice seal member, said orifice seal member comprising a sealing surface and defining a metering orifice through which the metered amount of fluid flows, said sealing surface being generally planar;
an orifice housing, said orifice housing defining a bore and comprising first and second surfaces, said bore being adapted to removably receive said orifice seal member and to sealably receive a fluid carrying conduit such that fluid from said conduit is communicated to the metering orifice, wherein the first and second surfaces have an axis in common with the sealing surface when the orifice seal member is received within the bore and are separated by a groove, said groove allowing said first surface to be axially compressed and radially deformed by said sealing surface and thereby sealably mount the orifice seal member to the orifice housing.

11. A device according to claim 10, wherein said orifice seal member further comprises a threaded stem, said threaded stem being surrounded by the sealing surface and being threadably received by the bore.

12. A device according to claim 11, wherein the first and second surfaces are co-planar.

13. A device according to claim 11, wherein the first surface is recessed from the second surface.

14. A device according to claim 11, wherein the first surface extends out of the second surface.

15. A device according to claim 11, wherein said threaded stem defines a fluid passageway, said fluid passageway being generally coaxial with said metering orifice, the fluid being communicated from said conduit to said metering orifice via the bore and fluid passageway.

16. A device according to claim 15, wherein said bore has a larger diameter than the fluid passageway and the fluid passageway has a larger diameter than the metering orifice.

17. A device according to claim 16, wherein said groove is generally V-shaped.

18. A device according to claim 11, wherein a cylindrical wall generally surrounds the bore and is drawn radially inwardly toward the bore to sealably mount the orifice seal member to the orifice housing.

19. A device for dispensing a metered amount of fluid, comprising:
an orifice seal member, said orifice seal member defining a metering orifice through which the metered amount of fluid flows;
an orifice housing, said orifice housing defining a bore and being adapted to removably receive said orifice seal member and to communicate a fluid to the metering orifice, wherein first and second surfaces are provided by one of said orifice seal member and said orifice housing and a sealing surface is provided by the other of said orifice seal member and said orifice housing, said first and second surfaces having a common axis with the sealing surface and being separated by a groove, said groove allowing the first surface to be spaced and separate from the second surface, said sealing surface and said first surface being generally planar and engaging each other and one of said sealing and first surfaces being at least partially axially compressed and radially deformed to sealably mount the orifice seal member to the orifice housing.

20. A device according to claim 19, wherein said first surface is engaged and compressed by said sealing surface to seal the central bore.

21. A device according to claim 19, wherein said orifice seal member further comprises a threaded stem, said threaded stem being surrounded by the sealing surface and being threadably received by the bore.

22. A device according to claim 20, wherein a cylindrical wall is provided between said bore and said groove, said cylindrical wall being drawn radially inwardly by engagement of said sealing surface and said first surface to encourage said orifice housing and said orifice seal member to sealably engage.

* * * * *